United States Patent
Bohach et al.

(10) Patent No.: US 6,908,675 B1
(45) Date of Patent: Jun. 21, 2005

(54) PROCESS TO REDUCE DUSTING AND IMPROVE FLOW PROPERTIES OF PIGMENTS AND POWDERS

(76) Inventors: William Louis Bohach, 9 Twiggs La., Savannah, GA (US) 31411; Christopher Scott Bohach, 9 Twiggs La., Savannah, GA (US) 31411

( * ) Notice: Subject to any disclaimer, the term of this patent is extended or adjusted under 35 U.S.C. 154(b) by 0 days.

(21) Appl. No.: 10/407,334

(22) Filed: Apr. 7, 2003

Related U.S. Application Data

(60) Provisional application No. 60/375,115, filed on Apr. 22, 2002.

(51) Int. Cl.$^7$ ................................................. B32B 5/16
(52) U.S. Cl. ..................... 428/402; 428/403; 428/404; 428/407; 106/436; 427/212
(58) Field of Search ................................ 428/402, 403, 428/404, 407; 106/436; 427/212

(56) References Cited

U.S. PATENT DOCUMENTS

| | | | | |
|---|---|---|---|---|
| 3,660,129 A | * | 5/1972 | Luginsland | 106/447 |
| 4,056,402 A | * | 11/1977 | Guzi, Jr. | 106/194.2 |
| 4,310,483 A | * | 1/1982 | Dorfel et al. | 264/117 |
| 5,199,986 A | * | 4/1993 | Krockert et al. | 106/712 |
| 5,733,365 A | * | 3/1998 | Halko et al. | 106/437 |
| 5,908,498 A | * | 6/1999 | Kauffman et al. | 106/437 |
| 6,132,505 A | * | 10/2000 | Linde et al. | 106/429 |

OTHER PUBLICATIONS

Wolfgang Pietsch Mixers for Growth–Tumble Agglomeration Bulk and Powder Engineering (Magazine) Dec. 2002 pp. 1 & 2 www.powderbulk.com.

Peter M. Koenig Agglomeration Methods & Equipment Hosokawa Bepex pp. 1–3, 10 333 N.E. Taft St Minneapolis, MN 55413, 1998.

Perry, R.H.; Green, D. Perry's Chemical Engineer's Handbook 7th Edition Sec 20, pp. 56 through 80 McGraw–Hill 1999.

* cited by examiner

*Primary Examiner*—Leszek B Kiliman

(57) ABSTRACT

Titanium Dioxide and other pigments or powders processed by this present process are smoothly discharging, low dusting, agglomerated, compaction resistant, extremely friable and fully dispersable. The process for the production of smoothly discharging pigment or powder consists of gently blending in the presence of an air flow and an electrostatic charge where said pigment or powder is being agglomerated with or without a treated or non-treated seed particle of the same or similar pigment whereas said pigment or powder in accordance with the invention yields a composition of a substantially spherical particulate that has a pseudo-particle size of 0.1–5.0 mm in the form of smoothly discharging, low dusting, non-sticky, agglomerated, compaction resistant pigment or powder, in which said pigment or powder particles are 80%–99.9% by weight, pigment, and in which the pigments or powders are compatible with inks, paints and plastics, and can be readily dispersed and incorporated into the same.

20 Claims, No Drawings

PROCESS TO REDUCE DUSTING AND IMPROVE FLOW PROPERTIES OF PIGMENTS AND POWDERS

CROSS-REFERENCE TO RELATED APPLICATION

This application claims the benefit of the provisional application U.S. Ser. No. 60/375,115 filed 22 Apr. 2002.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to a process for manufacturing low-dusting, smoothly-discharging, easily dispersible titanium dioxide and other pigments and cohesive powders that resist compaction, aging, lumping and caking, in which the pigment or powder has been subjected to micronizing or jet milling, sand milling, hammer milling, ground up or the like for use in foodstuffs, cosmetics, detergents, paint and plastics, inks and elastomers.

2. Description of the Prior Art

Titanium dioxide, iron oxides pigments, pearlescent pigments and powders including talc, and other metal oxide pigments, are used in the cosmetics, detergents paint, plastics, construction and other industries where pigments or powders are added to color and /or opacify the desired application and usually through intensive mixing. Some essential performance properties for the pigments are the dispersability of the pigment throughout the application system, the ease of handling and metering and dusting.

Dispersability is a measure of the ease with which the powder or pigment particles can be uniformly and intimately mixed in a system. Poor dispersion of particles can cause large agglomerates that may result in lumps, surface imperfections, color streaks, non-uniform coloration, or incomplete color development within the product. A further problem exists for pelletized or granular powder or pigment in that the amount of energy expended to disperse those types is exceptionally high and time consuming.

Inorganic pigments are normally produced for and used in the paints, plastics, or elastomer industries, and are in the form of a finely divided powder. The powders are usually jet-milled, sand milled, hammer milled or roller milled as a finishing step in their production. Milling contributes to dispersability and gloss, but milled pigments exhibit poor dry flow characteristics and are dusty. Such pigments all have the great disadvantage of producing dust. During their use, costly measures (for example of a workplace safety, ecological or quality assurance nature) are necessary, and valuable material is lost.

The ease of handling or lack thereof, takes into consideration difficulties associated with storing, transportation and mixing of the pigments in the manufacturing and processing system. The stability of pigment granules is necessary for good storage and transporting, thus averting aging, or the clumping of pigment into large agglomerates when in storage subjected to heat, humidity and pressure. This stability is brought about by using the high cohesive forces within the individual particle to an advantage rather than a disadvantage and depends on the compaction pressure or forming method used in making the granules. It should be noted that the goals of achieving good dispersability and good stability are usually contrary to one another.

Problems repeatedly experienced in handling large quantities of powders are caking, rat holing, bridging, or aging in compressed storage and clogging with a loss of pigment flow when in feed bins. Combined with the problems associated with dust from finely divided powders it is frequently the case that pigment compositions are preferred in pellet particle or granular form.

Surface treatment of pigments to achieve improved performance characteristics such as dispersion in coatings and plastic compositions, and may help in dry flow, is known in the art as is shown in the following patents:

U.S. Pat. No. 3,925,095 teaches that treating of inorganic pigments or fillers with hydroxyalkylated alkylene diamine dispersing agent will help flowability and dispersability in many applications.

U.S. Pat. No. 4,127,421 discloses the aqueous treatment of a lead chromate-containing pigment with a friable hydrocarbon resin and a cationic surfactant will produce free flowing, non-dusting granules.

Also known in the art is the absorption of waxes, aqueous solutions, polymers, and other oils, fats, or surfactants to help form free flowing granules.

In U.S. Pat. No. 4,285,994 the invention comprises a free-flowing nucleated pigment 50% by weight or more, in a spherical particulate of spray-chilled wax composition that has a coating and is partially absorbed into a pigment.

In U.S. Pat. No. 4,056,402, shows that aqueous slurries of inorganic or organic pigments are milled in the presence of a nonionic, polyether alcohol dispersing agent and nonionic cellulose ether to reduce dusting and improve dispersability.

U.S. Pat. No. 4,310,483 demonstrates a process for producing a granulate of fusible additives and pigments for plastics by thermal tumbling granulation, that comprises mixing the additive in powder form with an additive that softens between 30 degree C. and 200 degree C. and which have a particle size of 0.1–2.0 mm.

U.S. Pat. No. 4,375,520. This patent teaches the production of dustless particles, including pigments, by treatment of the particles with a solid low-molecular weight polymer and a liquid polymer substance such as expoxidized soybean oil at temperatures above the melting point of the polymer.

U.S. Pat. No. 4,464,203 discloses the treatment of inorganic or organic pigments with an amine and ethylene oxide block copolymer surfactant to improve pigment dispersibility and other properties in many applications U.S. Pat. No. 4,762,523 discloses coating a moist pigment with a polyester surfactant, then adding mineral oil or wax to the pigment and applying high shear stresses to achieve a free-flowing, permanently non-dusting pigment.

U.S. Pat. No. 5,604,279 shows that a colorant composition comprising at least one colorant very finely dispersed in a base material which is solid at room temperature is suitable for producing master batches and provides the way to dust-free colorant compositions One method for making free-flowing powders with low dust can be obtained by spray drying. These products generally exhibit poor pigmentary properties. Thus, pigment end users have generally had to choose between free-flowing, low dusting, spray-dried pigments with poor pigmentary properties and dusty, milled pigments with poor flow characteristics.

U.S. Pat. No. 3,660,129 establishes that titanium dioxide pigments are coated with hydrous oxides, then sand-milled and spray-dried to improve flowability.

U.S. Pat. Nos. (4,810,305) and (5,035,748) represent spray pelletization using siloxanes as hydrophobic additives. The stated spray dryer generally results in small particle sizes with a high proportion of fines. This means that a substantial proportion of the material is not realized from the dryer as directly usable pellets, but as fines, which must first be retained in a filter and then returned to the process. In spray dried products, hydrophobic post-treatment results in particles that have somewhat good flow properties but produce exceptionally large quantities of dust.

U.S. Pat. No. 5,199,986 demonstrates that colored building materials are produced by incorporating into the building materials inorganic pigments in the form of granulates which are free-flowing and not dust forming where the pigments are produced from spray dried granulates by post-granulating U.S. Pat. No. 5,199,986 also discloses a process wherein previously spray-dried inorganic pigment granules are coated with water and solutions of salts of boron, aluminum, silicon, titanium, zinc, brass, or tin, to improve processing and reduce dust production.

U.S. Pat. Nos. 5,733,365 and 5,908,498 illustrate a process for manufacturing titanium dioxide characterized by improved flowability, low dust production, and good dispersibility, without the energy-intensive and expensive step of micronization. In this process, at least one treating agent is deposited on a pigment that has been sand milled, as an aqueous slurry. The treated slurry is then spray dried for end-use performance without jet milling or micronization.

Known production processes for pigment pellets in addition to the spray granulation (spray drying using a disk or jet) are agglomeration pelletization (mixers, fluidized bed pelletizers, plates or pins) or compaction processes.

U.S. Pat. No. 6,132,505 instructs that inorganic pigment pellets comprising the steps of mixing at least one inorganic pigment powder with at least one water-soluble, hydrophilic or hydrophobic/hydrophilic auxiliary substance liquid in a quantity of 0.1 to 10 wt. %, relative to the pigment powder, and pelletizing the resultant mixture of by compacting and crushing the resultant mixture, one fraction having an average particle size of 100 to 1000 $\mu$m.

None of the aforementioned patents enlighten, teach or even suggest about a process consisting of mixing of pigments with the presence an air flow and an electrostatic charge to obtain a pseudo particle to provide an extremely friable, highly dispersible pigment that is smoothly discharging, with reduced dusting, resistant to compaction and easily metered, and this is the subject of this application.

DISCLOSURE OF THE INVENTION

The present invention implements the process for the continuous production of smoothly discharging, easily metered low dusting pigment compositions with good dispersibility even after long term compacted storage or aging-an effect of the environment and especially occurs as $TiO_2$ pigment is exposed to high humidity and high temperature. As a result, said $TiO_2$ tends to agglomerate into large lumps and there can be loss of optical properties of said titanium pigment when incorporated into powder coatings and plastics applications. This present process is comprised of blending or mixing a powdered pigment with or without a seed pigment for a time sufficient in the presence of airflow and an electrostatic charges and utilizing Van der Wall forces for substantially all of the pigment to be agglomerated into extremely friable spherical ersatz particles and is utilized to overcome aging as well. Temperatures used range from ambient to 100 deg C.

DETAILED DESCRIPTION OF THE PREFERRED EMBODIMENTS

It is an objective of this invention to produce free flowing, low dust pigment compositions, which can be dust free. It is also an objective of this invention for the pigment to have smooth flow and handling characteristics, resulting in little to no caking or compaction during storage and is easily dispersed after being stored in a compressed state. These pseudo-particles can be used for coloring paint, inks, plastics, elastomers, cosmetics or ceramics and other powder materials. These low-dust, smoothly flow compositions are particularly suitable for use with metering and feeding devices The invention is particularly effective with inorganic oxide pigments such as alumina, magnesia, titanium dioxide and zirconia. The invention can be practiced on materials less than about one micron in average diameter, and is preferably practiced on pigments and fillers, having average particle sizes of about 0.01 to about 10 microns. The spherical agglomerates produced are preferably at least about 0.01 millimeters in diameter, most preferably from about 0.1 millimeters to about 4 millimeters in diameter.

The pigments that can undergo the described process to provide the improved pigments of the present invention include any of the white or colored, opacifying or non-opacifying particulate pigments (or mineral pigments) known and employed in the surface coatings (e.g., paint) and plastics industries. For purposes of this present detailed description, the term pigments is used broadly to describe materials which are particulate by nature and nonvolatile in use and typically are most usually referred to as inerts, fillers, extenders, reinforcing pigments and the like and are preferably inorganic pigments.

Representative examples of pigments that can be treated are defined to provide the improved pigments of this invention include white opacifying pigments such as titanium dioxide, basic carbonate white lead, basic sulfate white lead, basic silicate white lead, zinc sulfide, zinc oxide, composite pigments of zinc sulfide and barium sulfate, antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide, and the like. Of all the pigments useful in producing the improved pigments of the present invention, the most preferred pigment is titanium dioxide.

Titanium dioxide pigment for use in the process of this invention can be either the anatase or rutile crystalline structure or a combination thereof. The pigment may be produced by known commercial processes which are familiar to those of skill in this art but which those processes do not form any part of the present invention. The specific pigment can be produced by either the well-known sulfate process or the well-known vapor phase oxidation of titanium tetrachloride process.

The titanium dioxide particles are particularly useful in the present invention that include anatase and rutile crystalline forms and may be treated or coated, e.g., with one or more oxides or hydroxides of metals including aluminum, antimony, beryllium, cerium, hafnium, lead, magnesium, niobium, silicon, tantalum, titanium, tin, zinc, or zirconium. The pigments of titania or other inorganic oxides can contain aluminum, introduced by any suitable method, including the co-oxidation of halides of titanium, (or other metal) and aluminum as in the "chloride process" or the addition of aluminum compounds prior to calcination in the "sulphate process". Other products, but not all inclusive, that can be manufactured as specified in this invention, to improve the properties include fly ash, powdered foodstuffs, cement, cosmetics, polytetrafluoroethylene, powders, talc and clay.

According to one aspect of the present invention, a smoothly discharging pigment consists of spherical faux particles, the pigment is 91% by weight or more pigment and may be to the extent of 99.9% by weight. Also present, but not significantly, are one or more surface treatments that are standard on some pigments.

In another aspect, minute amounts of environmentally friendly and non-toxic polyols, glycols and/or glycol ethers and/or siloxanes may be used as part of the process, where the pseudo-particles are not hindered in water dispersion, but actually aided. These agents are in minute amounts that they will not affect paint, ink or concrete processing and some will not affect polymer processing such as blown or cast film with lacing or the like. These pseudo-particles can be used for the pigmentation of aqueous or non-aqueous systems requiring low dust, good material flow, and accurate metering or feeding properties.

EXAMPLE 1

100 parts by weight of finely ground, black iron oxide pigment is mixed with the seed pigment of the same with 0.5 to 1.5 parts by total weight of propylene glycol. The mixture is placed in a specialized mixing vessel and blended. The process is continued and within about 0.10–15 minutes complete pseudo-particle formation occurs, and a smoothly discharging product is obtained.

Increase in bulk density of the processed pigment is nominally 36%

Angle of repose decreased from 55.6 deg to 41.6 deg, a decrease of 25%.

Increase in flow rate of the processed powder was from 100 gms. in 129 seconds to 100 gms. in 20 seconds.

48-hour compression test of between 4 and 6 psi yielded a completely crumbled pigment discharge upon ejection from the forming cylinder. The unprocessed pigment was a hard singular mass that did not even fracture upon ejection.

Decrease in available dust nominally 60%.

EXAMPLE 2

100 parts by weight of finely ground, black iron oxide pigment is mixed with the seed pigment of the same with 0.5 to 1 parts by total weight of polydimethylsiloxane, 320 cs. The mixture is blended in a mixing vessel of specialized design. The process is continued and within about 0.25–15 minutes, pseudo particle formation is complete, and a smoothly discharging product is obtained.

Increase in bulk density of the processed pigment is nominally 29%

Angle of repose decreased from 55.6 deg to 38 deg, a decrease of 32%.

Increase in flow rate of the processed powder was from 100 gms in 129 seconds to 100 gms. in 20 seconds.

48-hour compression test of between 4 and 6 psi yielded a completely crumbled, pigment discharge upon ejection from the forming cylinder. The unprocessed pigment was a hard singular mass that did not even fracture upon ejection.

Decrease in available dust nominally 55%.

EXAMPLE 3

100 parts by weight of a universal grade rutile titanium dioxide is blended, at temperature, in a mixing vessel of special design. The process is continued and within about 0.25–15 minutes pseudo particle formation is complete, and a smoothly discharging product is obtained.

Increase in bulk density of the processed pigment is nominally 15%

Angle of repose decreased from 52. deg to 38.6 deg, a decrease of ~26%.

Increase in flow rate of the processed pigment was from 50 gms at 1.6 gm/sec seconds to 50 gms at 6.2 gm/sec seconds.

48-hour compression test of between 4 and 5 psi yielded a completely crumbled, pigment discharge upon ejection from the forming cylinder. The unprocessed pigment was a hard singular mass that did not even fracture upon ejection.

Decrease in available dust nominally 70%.

Paint Dispersion comparisons on the Hegman scale are consistent with the unprocessed code standard pigment

EXAMPLE 4

100 parts by weight of a hydrophobic plastics grade rutile titanium dioxide, at temperature, is blended in a specialized mixing vessel. The process is continued and within about 0.1–15 minutes pseudo particle formation is complete, and a smoothly discharging product is obtained Increase in bulk density of the processed pigment is nominally 16%

Angle of repose decreased from 50.5 deg to 38.3 deg, a decrease of ~27%.

Increase in flow rate of the processed pigment was from 50 gms at 1.9 gm/sec to 50 gms. at 8.3 gm/sec seconds.

48-hour compression test of between 4 and 5 psi yielded a completely crumbled, pigment discharge upon ejection from the forming cylinder. The unprocessed pigment was a hard singular mass that did not fracture upon ejection.

Decrease in available dust nominally 80%.

Dispersion comparisons through a Brabender Extruder and into this polymer film are consistent with the unprocessed code standard pigment.

In all cases, dust values are assessed as a weight in comparison with the powder. The subjective visual observation of dust on transfer between containers is also used by way of comparison. In all cases, flow is determined by measuring the drain time in seconds from a cylindrical vessel (volume 50 or 100 gm) with a 60 deg. conical base through a defined bore (generally 10 mm).

What is claimed is:

1. A process for the production of a free-flowing powders selected from the group comprising titanium dioxide pigments iron oxide pigments, basic carbonate white lead, basic sulfate white lead, basic silicate white lead, zinc sulfide, zinc oxide, composite pigments of zinc sulfide and barium sulfate, antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide, alumina, magnesia, zirconia, kaolin clays, and polytetrafluorethylene powders and the mixtures thereof which adhere intimately together to form substantially spherical pseudo-particles ranging in size from 0.2 mm up to 5.0 mm in diameter where by the pigment is blended in a specially designed mixing vessel with the presence of an electrostatic charge and a air flow and reduces the dustiness of the powders at by a minimum of 50 percent.

2. The process according to claim 1 wherein intimate blending and mixing is carried out at a temperature falling within the range from 12 deg C. to 100 deg. C.

3. The process of claim 1 wherein nucleation and layering is carried out for a time of from about 0.25 minutes to about 15 minutes.

4. The Process according to claim 1, which includes the step of post treating of said pigments, and powders and mixtures thereof.

5. The Process according to claim 1, wherein the post treating step comprises application of alcohols, esters, silicone compounds, glycols, polyols, or polyethers, in a quantity of 0.01 to 3 wt. %, relative to pigment pellets.

6. A low-dusting, free-flowing, titanium dioxide pigments, iron oxide pigments, chromium oxide pigments, mixed metal oxide pigments, kaolin clays, and polytetrafluorethylene powders produced by the process of claim 1.

7. The spherical agglomerates produced by the process of claim 1 wherein pigment is titanium dioxide pigment.

8. The spherical agglomerates produced by the process of claim 1 wherein pigments and powders are comprised of material selected from the group comprising iron oxide pigments, chromium oxide pigments, mixed metal oxide pigments, metal oxide pigments, kaolin clays, and polytetrafluorethylene powders and mixtures thereof.

9. The process of claim 1 wherein a metal oxide coating on the pigment is present in an amount of from about 0 percent to about 1.5 percent by weight.

10. The spherical agglomerates produced by the process of claim 1 wherein titanium dioxide or iron oxide pigments, chromium oxide pigments, mixed metal oxide pigments, metal oxide pigments, kaolin clays, or polytetrafluorethylene powders is coated with at least one metal oxide and contains an oxide or hydroxide of aluminum, silicon or zirconium.

11. A specially designed mixer for processing as claimed in claim 1 is used to carry said titanium dioxide or iron oxide pigments, chromium oxide pigments, mixed metal oxide pigments, metal oxide pigments, kaolin clays, or polytetrafluorethylene powders to continuously produce free flowing particles while transporting the beyond the pigments apparent angle of repose.

12. The process mixing vessel of claim 1 is electrically grounded to prevent electrostatic discharge.

13. The process of claim 1 wherein electrostatic charges, van der Waal forces, in addition to any inherent electrostatic charges, cause self-attraction whereby nucleation takes effect.

14. The process of claim 1 wherein continuous mixing, lifting and rolling and avalanching provides a free flowing titanium dioxide or iron oxide pigments, chromium oxide pigments, mixed metal oxide pigments, metal oxide pigments, kaolin clays, or polytetrafluorethylene powders utilizes and promulgates a static charge to cause attraction of particles to one another reducing dust and nucleates faux particles to give a random size.

15. The process of claim 1 wherein vibration at various locations on the unit, will deareate the titanium dioxide or iron oxide pigments, chromium oxide pigments, mixed metal oxide pigments, metal oxide pigments, kaolin clays, or polytetrafluorethylene powders to increase the bulk density of the material but not to cause densification and caking of the material to prohibit dispersion.

16. The process of claim 1 wherein vibratory effects applied in the process on the inlet and on the shell of the mixer between the ranges of 1 and 3600 Hz induce deaerating of the pigment and aiding increasing bulk density.

17. The process of claim 1 wherein airflow through the unit is substantially enough to help dissipate heat from any hot material, aids in the nucleation and yet is not forceful enough to carry over any measurable quantity of pigment or powder.

18. A low-dusting, free-flowing, micronized or non-micronized pigment or powder produced by the process of claim 1.

19. A paint formulation containing the pigment or powder of claim 18.

20. A plastic formulation or masterbatch containing the pigment or powder of claim 18.

* * * * *